March 11, 1969    W. R. BROPHY, JR    3,431,782
MULTIANGLE GAUGE

Filed Dec. 6, 1966    Sheet 1 of 2

INVENTOR.
William R. Brophy
BY
*Jerry M. Presson*
ATTORNEY

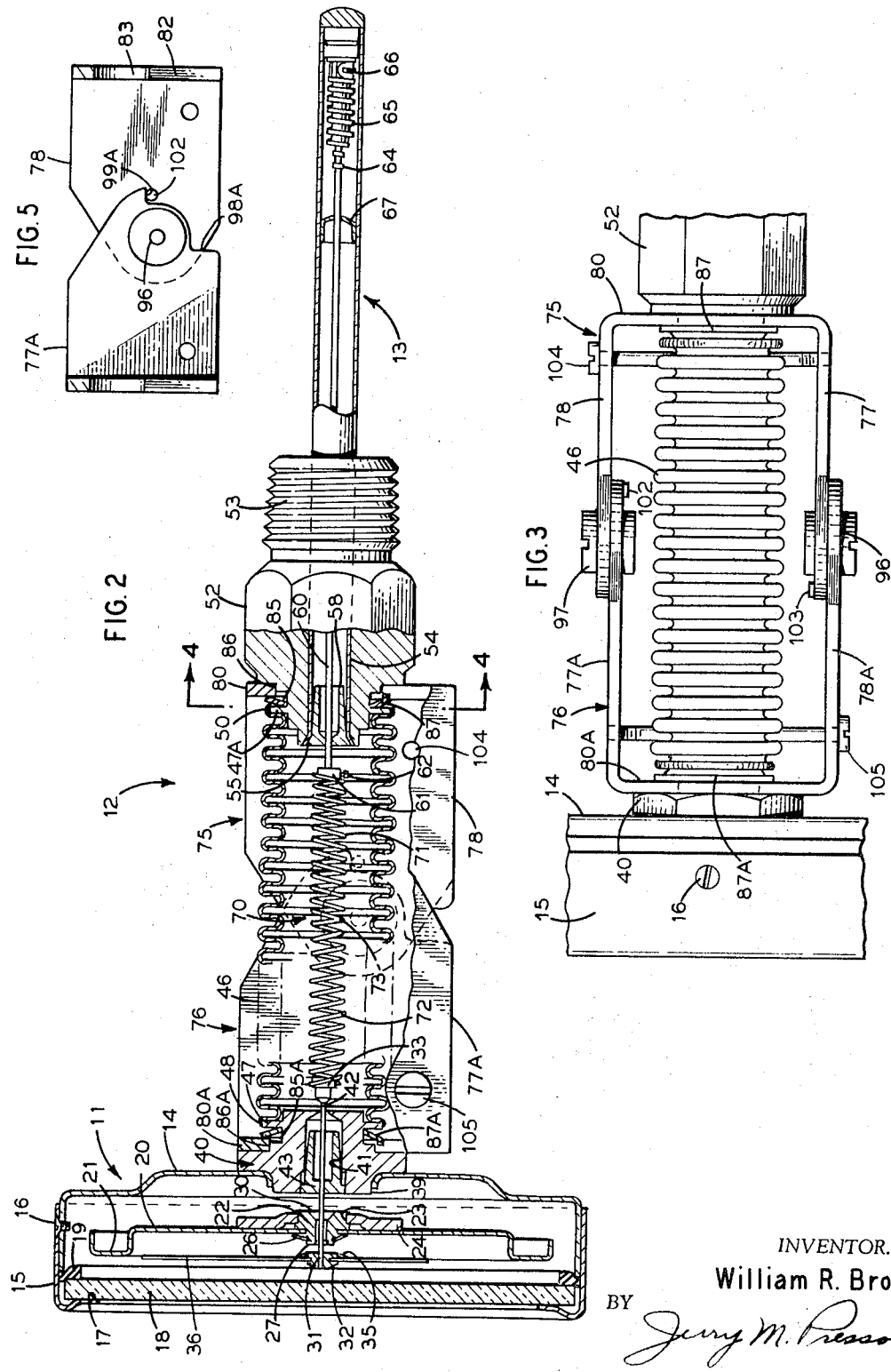

3,431,782
MULTIANGLE GAUGE
William R. Brophy, Jr., Elizabeth, N.J., assignor to Weston Instruments, Inc., Newark, N.J., a corporation of Delaware
Filed Dec. 6, 1966, Ser. No. 599,420
U.S. Cl. 73—363.9                11 Claims
Int. Cl. G01k 5/64

ABSTRACT OF THE DISCLOSURE

In a tiltable dial head type gauge including a pointer and a condition-sensing device, the elongated flexible element which is employed to transmit the angular displacement of the condition-sensing device to the pointer while permitting the bending of the pointer about the condition-sensing device comprises two serially-connected but oppositely wound spring sections. The spring sections are matched to one another so that their opposite windings mutually nullify internal, torsionally-directed stresses which would cause the pointer end of the spring to rotate about the device end solely by reason of the flexible element being bent.

---

This invention relates generally to multiangle gauges and, more particularly, to dial gauges of a type characterized as having a flexible connection between the gauge dial head and the gauge stem which permits multiangle tilting of the dial head about the stem.

Gauges of the type presently under consideration, typically include a dial head having a circular dial mounted therein that is graduated to provide an indication of the instantaneous value of a parameter, such as temperature or pressure, which is being measured by the gauge. A pointer is mounted on a staff for pivotal movement parallel to the plane of the dial and is referenced to the graduations on the dial. A circular piece of transparent glass covers and seals the dial and the pointer from dust and other extraneous matter.

Gauges of the aforementioned type additionally include a stem that encases a condition-sensing transducer having the facility of producing an angular displacement representative of the value, or change in value, of the particular parameter which is being sensed or measured by the gauge. Typical of such transducers are Bourdon tubes that respond to pressure or pressure changes and bimetallic coils that respond to temperature or temperature changes.

The condition-sensing transducer generally is connected to the pointer staff through a helical spring which possesses a stiff resistance to torque so that an angular displacement of the end of the condition-sensing transducer connected to the spring is transmitted with integrity to the pointer staff. The spring additionally possesses sufficient flexibility about its helical axis to permit tilting or bending of the dial head about the stem. To provide a bending capability between the dial head and the stem while preventing relative rotation between the head and the stem, an elongated torque-resistant member capable of flexing about its longitudinal axis is anchored at its opposite ends to the stem and the dial head. The torque-resistant member may take the form of a bellows that encases the helical spring and thereby serves the additional purpose of protecting the spring from the environment in which the gauge is used. In addition, linkage mechanism is usually employed to pivotally connect the dial head to the stem. Such mechanism serves to constrain the dial head and the dial head end of the helical spring for movement through a predetermined locus.

In gauges of this type, the spring which serves to transmit angular displacements of the condition-sensing transducer to the pointer staff may increase or decrease in length when the spring it bent about its longitudinal axis. This characteristic of coil springs is well-known to those working in the gauge art and is attributable to many variables such as the type of spring, the spring temperature, the ratio of spring diameter to wire diameter (in the case of springs formed of wire of circular cross-section), the linkage mechanism which guides the dial head end of the spring during bending, the degree and direction of spring bend and the angular orientation of the condition-sensing transducer that is connected to the spring. No attempt will be made herein to describe how each of these factors or combinations of these factors may act or coact to effect the behavior of a spring when it is bent.

For the purpose of this invention, it suffices to state that by reason of these and other factors, it is often difficult to predict whether a particular coil spring, when bent about its longitudinal axis in a given direction and through a given angle, will elongate or retract. Even more difficult would be a prediction as to the amount by which the spring might undergo elongation or retraction.

The coil spring is usually constrained at one end against axial displacement and rotation about its longitudinal axis relative to the angular position of the condition-sensing transducer, and is usually constrained only against axial displacement at its opposite end by the freely rotatable staff. With the ends of the spring thusly constrained against axial displacement, any variation in spring length caused by bending the spring about its longitudinal axis will generate combinations of internal spring stresses. Such stresses are primarily in the nature of flexural and torsional stresses and are manifested by the end of the spring which is affixed to the freely rotatable pointer staff undergoing an appreciable and undesirable rotation relative to the end of the spring which is anchored to the condition-sensing transducer. The magnitude and direction of this rotation is generally difficult to predict, as mentioned above, but results from the spring winding (and increasing the number of coil turns) upon elongation, for instance, and unwinding (and decreasing the number of coil turns) upon retracting. Of practical importance is that the winding or unwinding of the spring which causes rotation of the pointer staff when the constrained spring is bent is not the result of an angular displacement of the condition-sensing transducer and, consequently, the pointer provides an incorrect indication of the value of the parameter being measured by the gauge.

The prior art has resorted to various expedients to circumvent the problem of the coil spring causing incorrect gauge indications as a result of its changing length by reason of bending. Notable among these expedients are relatively complex linkage and combinations of gear and linkage assemblies which are designed basically to constrain the dial head end of a spring to movement in a locus about its stem end which maintains substantially constant the free length of the spring. As will be appreciated by those working in this art, these expedients at best typically maintain the free length of the coil spring only approximately constant and have the obvious disadvantages of increasing the complexity and the cost of manufacturing the gauge.

It is an object of this invention to provide a new and improved dial gauge of the tiltable dial head type, which simply and yet effectively overcomes the aforementioned deficiencies of conventional gauges of this general type.

Another object of this invention is to provide a gauge of the tiltable dial head type which utilizes a new and improved torque-resistant element for transmitting the angular displacement of a condition-sensing transducer to a rotatable pointer mounted in the dial head.

Yet another object of this invention is to provide a dial gauge including a tiltable dial head and a stem flexibly coupled to the dial head which utilizes a relatively simple and inexpensive linkage for pivotally coupling the dial head to the stem.

With these and other objects in view, the present invention provides a new and improved gauge of the tiltable dial head type, wherein the elongated flexible element which is employed to transmit the angular displacement of the condition-sensing device to the gauge pointer self-nullifies combinations of internal flexural and torsional stresses created by bending the spring about its longitudinal axis. The characteristic of the flexible element and, more specifically, a helical spring, to self-nullify internal stresses is conveniently provided by forming the spring as two serially-connected spring sections with the coils of one section being wound in an opposite directional sense to the coils of the other section. Whether or not constrained against changes in length, the spring formed of two sections as described may bend or flex about its longitudinal axis and assume virtually any bending configuration or curvature, but the resultant torsionally-directed force which is produced in one spring section by a combination of stresses created by bending that one spring section, are matched and nullified by an equal and opposite torsional force which is simultaneously created in the other spring section. The overall effect of this nullification of resultant torsionally-directed forces by the two spring sections is manifested by the absence of any rotation of the pointer end of the spring caused solely by reason of the spring being bent.

Since, in accord with this invention, the problem of spring elongation by reason of bending is not troublesome, this invention makes possible the use of a relatively simple and inexpensive linkage assembly for pivotally coupling the dial head of the gauge to the gauge stem. Such a pivotal linkage assembly is comprised, for example, of a pair of brackets each having two parallel side plates joined by a transverse end plate. The side plates of both brackets are journalled together adjacent the free ends thereof to permit tilting of the dial head in directions parallel to the plane of the side plates. Both end plates are formed with generally keyhole-shaped interior walls having circular wall portions that may be readily and easily mounted for rotation upon annular shoulders respectively mounted on the dial head and on the stem. Other pivotal couplings, serving the same purpose, will readily suggest themselves to those conversant with the art.

For a better understanding of the present invention, together with other and further objects thereof, reference may be had to the following description taken in connection with the accompanying drawings, the scope of the invention being pointed out in the appended claims.

Referring to the drawings:

FIGURE 2 is a partially sectioned plan view of the gauge, the section being taken generally along section lines 2—2 of FIGURE 1 and depicting by solid lines a spring having the characteristic of self-nullifying torsionally-directed stresses developed by bending the gauge.

FIGURE 3 is a fragmentary plan view of FIGURE 1, illustrating a bracket assembly, constructed in accordance with this invention, for rotatably and pivotally coupling a dial head to a connector assembly.

FIGURE 5 is a side sectional view taken along the longitudinal axis of the bracket assembly and shows in detail mechanism for limiting the degree of dial head tilting.

Figure 1:
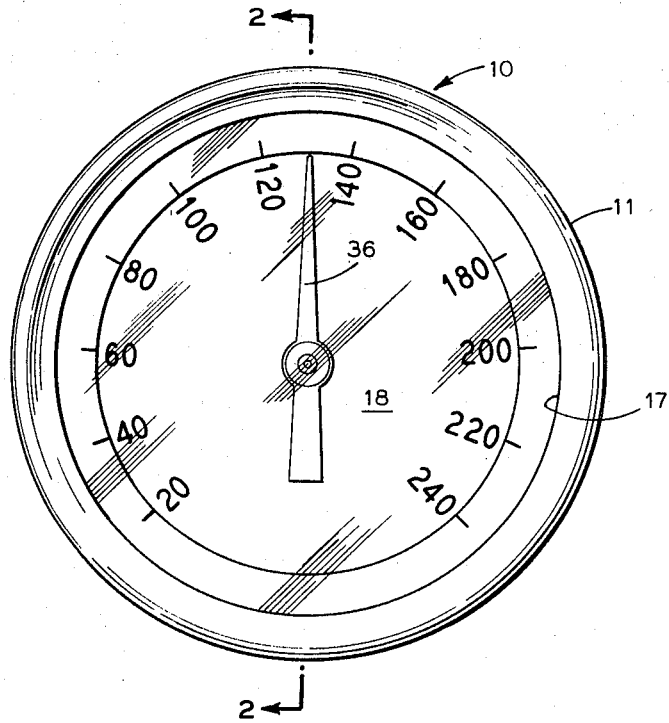
FIGURE 1 is an end elevation of a multiangle gauge constructed in accordance with this invention viewed from the dial head end of the gauge.

Referring to FIGURES 1 and 2 of the drawings for a more complete understanding of this invention, the gauge 10 basically comprises a circular dial head 11, a flexible coupling section 12, and a hollow tubular stem 13, the section 12 coupling the dial head 11 for pivotal movement about the stem 13.

Considering each of these parts separately, the dial head 11 includes a symmetrical, generally cup-shaped casing 14 having an axis of symmetry and a frontal annular plate 15 detachably connected thereto by machine screws 16 or by any other suitable means such as a threaded or bayonet-type connection.

The plate 15 has an inwardly curved circular edge 17 which presses the peripheral edge of a transparent circular cover or window 18 against a resilient ring gasket 19 and, hence, against the adjacent circular edge of the casing 14. The transparent cover 18 may be composed of transparent glass or any other suitable material and with the transparent cover pressed tightly against the gasket 19, the interior of the casing 14 is sealed against the entry of dust, moisture and other undesirable matter.

Concentrically housed within the sealed casing 14 is a planer dial 20 having an outwardly extending circular rim 21 which is graduated in terms of the parameter being measured by the gauge 10. Although the rim 21 is illustrated in FIGURE 1 as being graduated in terms of temperature, it may also be graduated in terms of some other parameter depending upon the intended use of the gauge 10. A bushing 22 of circular cross-section mounts the dial 20 and in turn is mounted stationary in a circular aperture 23 formed in a supporting plate 24 of generally rectangular outline. The plate 24 extends diametrically across the interior of the casing 14 and is fixed at its opposite ends by, for example, welding, to the interior wall of the casing. The bushing 22 may be staked into the aperture 23 prior to mounting the plate 24 in the casing 14.

The dial 20 is held in tight frictional contact with the plate 24 by a spring retaining washer 26, FIGURE 2, which is pressed over a flange 27 formed on the dial end of the bushing 22. This method of mounting allows the dial 20 to be manually rotated about the axis of symmetry of the dial head 11 to present the graduations on the dial rim 21 in any desired angular orientation to one reading the gauge 10. The bushing 22 has a concentric bore 30 formed therein for accommodating a pointer staff 31 for rotation about its rotational axis. The rotational axis of the staff 31 is coaligned with axis of symmetry of the dial 20 and a bushing 32 is press-fitted onto the outermost end of the staff 31. A bushing 33 is similarly affixed to the innermost end of the staff 31. The bushing 32 receives a retaining washer 35 that presses and holds a pointer 36 in firm frictional engagement with the bushing 32. To prevent the staff 31 and the bushing 32 from rotating while the pointer 36 is turned manually to effect any required zero correction of the gauge 10, the outermost ends of the staff 31 and the bushing 32 may be slotted transversely to receive the blade end of a screwdriver, or equivalent tool, that may be used to fix the staff 31 and the bushing 32 against rotation after the front plate 17 and the window 18 are removed from the dial head 11.

Considering now the flexible coupling section 12, FIGURE 2, a cylindrical dial head end 39 of a hub 40 is forced tightly into a circular opening formed by inturning a circular segment of the casing 14 and the hub 40 is then welded to the casing 14. The exterior of the hub 40 immediately adjacent the casing 14 may be formed as a hexagonal nut that is easily gripped by a wrench or similar tool to hold the dial head 11 against rotation as a subsequently described hinged bracket arrangement is turned. A bore 41 is formed centrally in the hub 40 and the longitudinal axis of the bore 41 is preferably coaligned with the axis of symmetry of the dial 20. The bore 41 tapers towards its innermost end to a concentric bore 42 or lesser diameter which serves as a bearing for the inwardmost end of the staff 31. A hollow, tapered bushing 43 is forced into the bore 41 and is aligned with the bore 42 to provide additional axial alignment and support for the staff 31.

In order to prevent relative rotation between the dial head 11 and the stem 13, while permitting the dial head to tilt about the stem, the flexible coupling section 12 includes an elongated bellows 46 characterized as having a stiff resistance to torque but having a flexing capability about its longitudinal axis. It is, of course, well-known to utilize metal bellows for the purpose described above. The bellows 46 is anchored to a circular flange 47 formed on the hub 40 by, for instance, welding at 48. The opposite end of the bellows 46 may be similarly fixed at 50 to a flange 47A formed on a connector 52 and which is similar to the flange 47. With the flexible bellows 46 anchored to the hub 40 at the dial head end thereof and to the connector 52 at the opposite end thereof, any angular displacement between the casing 14 and the connector 52 is negligible since, as related above, the bellows 46 offers high resistance to torque.

Formed integral with the connector 52 is a bushing 53 which is externally threaded for connecting the gauge 10 to a conduit or tank having a correspondingly internally threaded well or opening in which the stem 13 is to be inserted.

In order to thread and tighten the bushing 53 into the well or opening through the use of a wrench or similar tool, the exterior of the connector 52 is made hexagonal. Considering now, in detail, the means by which the stem 13 is mounted on the gauge 10, the connector 52 and the bushing 53 have a concentric bore 54 extending therethrough, the bore 54 being chamfered at 55 to receive the flared end of the stem 13 that is inserted tightly into the bore 54. The stem 13 is correspondingly flared at 55 to prevent the withdrawal of the stem 13 from the connector 52 and to provide a seat for a tapered bushing 58 that serves to center and support a shaft 60 having substantially the same diameter as the staff 31. The shaft 60 has one end inserted into a collar 61 which is fixed thereto by a set screw 62, the opposite end of the shaft 60 being anchored to the angularly displaceable end 64 of a suitable condition-sensing transducer housed in the bottom of the stem 13. For purposes of illustration, the transducer is shown as a ribbon-like bimetallic coil 65 having its opposite end 66 suitably anchored to the interior wall of the stem 13. In addition, at the transducer end of the stem 13 another bushing 67 is inserted to provide additional rotational support for the corresponding end of the shaft 60.

The bimetallic coil 65 expands and contracts in response to temperature changes and causes a corresponding angular rotation of the shaft 60 and the collar 61 in a manner well-known to those working in this art. As mentioned above, the bimetallic coil 65 is but one type of transducer which might be used in the gauge 10 if the gauge is to be employed as a thermometer, but if, for example, the gauge 10 were to be used as a barometer, the dial might be suitably calibrated in terms of pressure and a Bourdon tube substituted for the bimetallic coil 65.

Reference is again directed to the flexible coupling section 12 with a view towards a detailed consideration of the spring 70 which transmits the angular displacement of the shaft 60 to the staff 31 and, hence, to the pointer 36. The coil spring 70 is illustrated as helical and is characterized as possessing a sufficiently stiff resistance to torque to ensure that the angular displacement of the shaft 60 is transmitted with integrity to the staff 31 to cause a proportional deflection of the pointer 36. Additionally, the spring 70 should possess sufficient flexibility about its axis of rotation to permit tilting of the dial head about the stem 13.

The spring 70 is illustrated as having a constant pitch diameter and an internal diameter which is slightly larger than the outer diameters of the bushing 33 and the collar 61. With the internal diameter of the spring 70 slightly larger than the diameters of the bushing 33 and the collar 61, one or more end coils of the spring 70 may be slipped over the bushing 33 and over the collar 61 and secured to the periphery of both by, for example, welding or brazing.

The coil spring 70 is comprised of two series-connected coil sections 71 and 72 of equal but opposite pitch. In all other respects, the sections 71 and 72 are identical, that is to say, the sections 71 and 72 have identical pitch diameters, identical number of turns, and so forth. The sections 71 and 72 join serially at a common junction 73, which represents a point half the length of the spring 70, and which is also, therefore, the midpoint of the coil sections 71 and 72. The coil spring 70 may be formed from a single, continuous length of spring material of constant cross-sectioned area. For the relatively short length of spring material required for the coil 70, the characteristics or property of the material, particularly its spring constant, will not vary to any appreciable extent throughout the two oppositely wound spring sections.

As related hereinabove, when the coil spring is bent about its stem end, internal stresses are created which tend to cause either a winding or an unwinding of the dial head end of the coil spring relative to the end of the spring that is constrained by the condition-sensing transducer. A winding of the spring may be manifested by an increase in the total number of coil turns and, conversely, an unwinding of the spring may be manifested by a decrease in the total number of coil turns. The internal stresses which cause a rotation of the freely rotatable end of the coil relative to the constrained coil end are principally flexural and torsional stresses which combine to produce a resultant stress having a torsional component, that is, a component along the torsional axis of the spring. By providing two matched coil sections 71 and 72 wound in opposite directions, the torsional component of the stresses developed in one coil section, for instance, in the coil section 71, as a result of that section being bent through an arc about its helical axis will be substantially equal in magnitude, but opposite in direction, to the torsional component of the stresses which are simultaneously created in section 72 which is bent through substantially a geometrically similar arc.

Since the cross-sectional area of the spring 70 is constant throughout both sections 71 and 72 the torsional component of the resultant force created by the internal stresses in both sections 71 and 72 will be of equal magnitude but of opposite direction. Thus, the torsional component of the force created in one coil section is nullified by the torsional component of an equal force created in the other coil section. The overall effect of the self-nullification of internally-created and torsionally-directed stresses is that with the stem end of the section 71 anchored to rotate only with regular displacement by the bimetallic element 65, the dial head end of the section 72 will not rotate about its helical axis when the dial head 11 is tilted relative to the stem. Of course, when an external tangential force is applied to the stem end of the section 72 by virtue of the shaft 60 and the collar 61 rotating in response to an angular displacement of the transducer 65, this external force will be transmitted by corresponding equal angular displacements of the sections 71 and 72 to the pointer 36.

To facilitate an understanding of how the coil spring 70 would respond to a bending that might be experienced during usage of the gauge 10, assume that the coil section 71 is wound with a right-hand twist, that is, in a counterclockwise direction, as viewed from the collar 61, and that the coil section 72 is wound with a left-hand twist, that is, clockwise, as viewed from the collar 61. Further assume that the spring 70 is bent in a direction and through an acute angle about its stem end which would cause the spring section 71 to unwind and decrease its total number of turns. Since the bimetallic element 65 constrains the stem end of the section 71 against angular displacement by torsional forces created during the bending of the spring 70, only the junction 73 end of the section 71 is free to rotate. Assuming that the junction 73 rotates clockwise, as viewed from the stem end of the section 71, in response to the unwinding of the section 71, the clockwise rotation of the junction 73 would cause the section 72 to unwind the same amount as the section 71 unwinds, but in an opposite direction.

Thus, an increase or decrease in the number of turns of the section 71 is offset by an equal respective increase or decrease in the number of turns of the section 72 and, therefore, no net rotation occurs between the end of the spring 72 connected to the bushing 33 and the end of the spring 71 connected to the collar 61.

Although the spring 70 has been shown and described as being comprised of a pair of series or tandem-connected cylindrical helical sections 71 and 72, a coil spring employing a pair of identical series-connected spiral spring sections characterized as having a pitch diameter that varies along the length of each section, but having an equal but opposite pitch and possessing the aforedescribed torsionally-directed stress-nullifying characteristics of the spring 70, might be employed in the gauge 10 as an alternative to the spring 70. In addition, although the coil sections 71 and 72 have been disclosed as being of the same material with the springs of the same cross-sectional area and shape as well as the same number of turns in each coil section, it is also possible to allow the two coil sections 71 and 72 to be composed of two different spring materials. However, this modification gives rise to problems of changing the pitch, pitch diameter or the number of coil turns in one or both sections to produce the desired stress-nullifying effect between the two sections.

Moreover, although a single pair of oppositely wound coil spring sections is described above, the spring 70 may be formed with two or more pairs of series-connected, oppositely wound coil sections. In such a case, it is not necessary that each coil section be of an equal but opposite pitch to its contiguous coil section. To illustrate, a pair of series-connected coil sections wound in the same direction might be series-joined together and to another pair of series-connected coil sections wound oppositely to the first pair. The coil sections of each pair might be identical but of equal and opposite pitch to the corresponding coil sections of the other pair but dissimilar in, for example, their pitch diameter, with respect to one another.

Since the problem of the coil spring elongating or retracting by reason of bending about its longitudinal axis and causing an erroneous indication of the pointer is for most purposes, obviated by the utilization of the coil spring 70, the assembly which serves to pivotally couple the dial head 11 to the stem 13 and, more specifically, the hub 40 to the connector 52 may comprise a pair of relatively simple hinged brackets.

As seen in FIGURES 2 and 3, two such brackets are identified as 75 and 76, and are formed preferably from a single piece of non-brittle material, such as sheet steel so as to have a degree of bending compliance. Since the bracket 75 may be identical to the bracket 76, a description of the bracket 75 will also suffice as a description of the bracket 76. Parts of the bracket 76 and associated structure which are identical to parts of the bracket 75 and its associated structure will be hereinafter distinguished by affixing the suffix A to the part-identifying numeral.

The bracket 75 includes a pair of parallel side plates 77 and 78 joined by an end plate 80 formed with a key-hole opening which defines two opposed straight plate edges 81 and 82 and a contiguous circular edge plate 83. The edges 81 and 82 are far enough apart to span and pass over a cylindrical shoulder 85 formed on the connector 52, FIGURE 2, but are close enough to prevent their spanning an adjacent cylindrical shoulder 86. The circular edge 83 has a radius slightly greater than the radius of the shoulder 86 so that the circular edge 83 may be seated somewhat tightly on the shoulder 86. To effect the seating of the edge 83 on the shoulder 86, the end plate 80 is pressed down over the shoulder 85 and the circular edge 83 oriented substantially concentric with the shoulder 86. The end plate 80 is then pushed toward the bushing 53 end of the shoulder 86 until the edge 83 is properly seated upon the shoulder 86, the straight edges 81 and 82, by virtue of their closer spacing, preventing any appreciable radial movement between the edge 83 and the shoulder 86.

Figure 4:
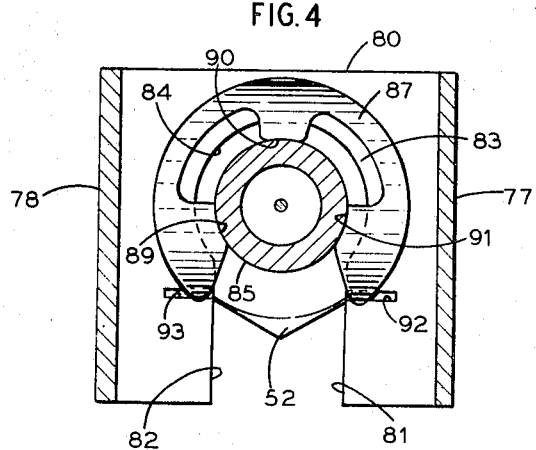
FIGURE 4 is an end sectional view taken along lines 4—4 of FIGURE 2, and illustrates mechanism for rotatably and pivotally coupling the stem end of the bracket assembly to the connector assembly.

The shoulder 85, FIGURE 2, by reason of having a smaller diameter than both the flange 47A and the shoulder 86 and by reason of its position between the flange 57 and the shoulder 86 provides an annular seat for a horseshoe-shaped retaining ring 87. The ring 87, FIGURE 4, has three tabs 89, 90 and 91 bowed slightly from the plane of the ring 87. With the ends of the ring 87 inserted over the shoulder 85 the tabs 89, 90 and 91 will abut and press the flange 47A, to resiliently force portions of ring edge against the end plate 80. As a result, the plate 80 is pressed into tight frictional engagement with the connector 52. Relative angular rotation between the end plates 80 and 80A and the rings 87 and 87A, respectively, is prevented by forming a pair of recesses 92 and 93 in the end plate 80 and 80A and thereafter bending the ends of the rings 87 and 87A downwardly into these recesses.

In the same fashion and for the same reasons related directly above, the bracket 76 has its end plate 80A pressed into tight frictional contact with a shoulder 86A formed on the hub 40. A reduced diameter hub section 85A forms an annulus which receives the three tabs (similar to the tabs 89, 90 and 91) of ring 87A. These tabs abut the flange 47 and resiliently press portions of the ring edge against the end plate 80A to provide a tight frictional engagement between the hub 40 and the plate 80A. Although the end plates 80 and 80A are pressed tightly against the connector 52 and the hub 40, respectively, with the gauge in the zero-degree tilt position, wherein the longitudinal axis of the stem 13 is substantially coaligned with the axis of symmetry of the dial head 11, the brackets 75 and 76 may be turned 360° about the axis of symmetry of the gauge 10.

The dial head 11 is hinged to the stem 13 for tilting compliance with respect thereto, by overlapping parallel side plates 77, 77A and 78, 78A of the brackets 75 and 76, respectively. The side plates 77, 77A and 78, 78A are journaled for pivotal movement on concentric machine screws 96 and 97, respectively. In order to lessen the chance of the bellows 46 bending through an arc which might be so severe as to cause the spring to rub against the convoluted interior wall of the bellows 46, with the dial head 11 in the zero-degree tilt position, FIGURE 2, the concentric axis of the screws 96 and 97, and thus the journal axis of the brackets 75 and 76, is located in a plane that is perpendicular to the longitudinal axis of the spring 70.

Without sacrificing the simplicity of the bracket assembly, it is possible to lessen the chance of the spring 70 rubbing against the inner wall of the bellows 46 by providing a practically uniform bending curvature to the bellows 46 and a similar bending curvature to the spring 70. To effect this end, the journal axis of the brackets 75 and 76 may be located in a plane that is perpendicular to the longitudinal axis of the spring 70 and passes through the midpoint 73 of the spring 70 and, in addition, may be offset from the junction 73 in a direction parallel to the planes of the bracket side plates 77, 77A and 78, 78A. The amount of offset required is governed primarily by the length of the coil sections 71 and 72 under freely suspended conditions and the angle through which the dial head end of the coil 72 can be bent, as will be appreciated by those skilled in the art. Assuming that the maximum angle of coil bend is ninety degrees, for one inch lengths of coil section 71 or 72, ¼ inch pitch diameter and having ten turns each, the amount of offset required would be approximately ¼ inch.

Since the above objective requires that the pivotal axis of the bracket assembly be offset in the direction of spring bending when the dial head 11 is in a zero-degree tilt position, the coil spring 70 is prevented from bending away from the journal axis and from bending not more than ninety degrees toward the journal axis. In furtherance of this objective, the journaled ends of the side plates 77 and 77A are sectored to provide two pairs of opposed edges, the pair of edges formed in the side plate 77A being illustrated in FIGURE 5 and designated therein by numerals 98A and 99A. The pair of plate edges extend radially from the axes of the machine screws 96 and 97 and the edges of each pair are at right angles with respect to one another. A pair of pins 102 and 103, repectively, FIGURES 3 and 5, project from the inner surface of side plates 78 and 78A, respectively, and may alternately abut the edges 98A and 99A of the side plate 77A and the corresponding edges, not shown, of the side plate 77 when the dial head 11 is tilted alternately from a zero-degree tilt position, FIGURES 2 and 3, to a position at ninety degrees with respect to this position. Thus, with the bracket side plates 77, 77A and 78, 78A turned parallel to the direction of desired dial head tilt and with the sectors facing in this direction, the dial head 11 may be bent through an arc of ninety degrees about the pivotal axis of the screws 96 and 97. Obviously, if offsetting the pivotal axis of the brackets 75 and 76 were not desired, the pins 102 and 103 need not be provided nor would there be a need to sector the bracket side plates.

To fix the brackets 75 and 76 in any angular position relative to the coupling section 12, it may be necessary to increase the amount of frictional contact between the end plates 80 and 80A, FIGURE 2, and the shoulders 86 and 86A, respectively. For this purpose, a pair of bolts 104 and 105 having threaded ends pass transversely through the side plates 78 and 78A, respectively, adjacent the end plates 80 and 80A, respectively, and threadedly connect in holes formed in the side plates 77 and 77A, respectively. When the bolts 104 and 105 are tightened and by virtue of the compliable property of the brackets 75 and 76, the edges 81 and 82 of the end plate 80 and the corresponding edges of the end plate 80A will be drawn toward one another causing an increase in the amount of frictional contact between the end plates 80 and 80A and the shoulders 86 and 86A, respectively.

While there has been described what is at present considered to be a preferred embodiment of this invention, it will be obvious to those skilled in the art that various changes and modifications may be made in the instrument without departing from the invention, and it is, therefore, intended to cover all such changes and modifications as fall within the true spirit and scope of the invention.

What is claimed is:

1. In a gauge including a dial, a staff having a pointer fixed to one end thereof and movable with reference to said dial, a stem, means housed in said stem for providing an angular displacement representative of a condition sensed by said means, the improvement comprising: an elongated, flexible coupling operably connecting said means to said staff and bending to permit multi-angular tilting of said dial about said stem, said flexible coupling being characterized as flexible in bending but transmitting angular displacement of said means with integrity and having at least two series-connected elongated coil sections, each section being matched to the other section such that the internal torsionally-directed force developed in one section by bending said coupling about the longitudinal axis thereof is substantially equal in magnitude to the internal torsionally-directed force developed by the simultaneous bending of the other of said sections, said one section being wound in an opposite sense to said other section so that the internal torsionally-directed forces developed between said sections are nullified.

2. The gauge as claimed in claim 1, wherein both of said sections include helical coils having common terminal ends joined together and opposite terminal ends respectively connected to the condition-sensing means and said pointer.

3. In a multi-angle gauge of the type characterized as comprising a dial head having an axis of symmetry and planar dial mounted in said dial head with the plane of said dial perpendicular to said axis of symmetry of said dial head, a staff and a pointer fixed to one end of said staff and movable with reference to said dial, a stem member, a condition-sensing means mounted in said stem member for providing an angular displacement representing a change in the condition sensed by said means, an elongated member flexible in bending along and about the longitudinal axis thereof but resistant to torque for joining said dial to said stem, the improvement comprising: an elongated coil housed in said member with the longitudinal axis of said coil substantially parallel to the longitudinal axis of said elongated member, said coil coupling said condition-sensing means to said staff and being flexible in bending along and about the longitudinal axis thereof but transmitting angular displacements with integrity, said coil comprising at least two tandem-connected coil sections wound in opposite directions as viewed from one end of the coil, the coil sections being constructed such as to mutually nullify internal torsionally-directed stresses produced therein when said dial head is tilted in directions perpendicular to the plane of said dial so that the staff end of one coil section does not rotate relative to the condition-sensing means end of the other coil section solely by reason of the dial head being tilted.

4. The gauge as claimed in claim 3, wherein each of said coil sections includes at least one cylindrical, helical coil.

5. The gauge as claimed in claim 3, wherein said stem is elongated and has a longitudinal axis and which additionally comprises, a pair of brackets, means mounting one of said brackets for rotation about said axis of symmetry of said dial head, means mounting the other of said brackets for rotation about said longitudinal axis of said stem, and means journaling said brackets for pivotal movement about a journal axis which is perpendicular to said axis of symmetry of said dial head, the journal axis of said brackets being located proximate a point that is midlength of said coil.

6. The gauge as claimed in claim 5, wherein means is mounted on said brackets for limiting the angular displacement of said brackets to an angle of substantially ninety degrees.

7. The gauge as claimed in claim 6, wherein said means for limiting the angular displacement of said brackets comprises, a pair of spaced-apart projections formed on the journaled end of at least one of the brackets, a pin mounted on the corresponding journaled end of the other bracket and positioned to abut each projection, said projections being positioned with respect to said one bracket such that said pin abuts one projection when the axis of symmetry of said dial head and the longitudinal axis of said stem are substantially coaligned and abuts the other projection when the axis of symmetry of said dial head is perpendicular to the longitudinal axis of said stem.

8. The gauge as claimed in claim 5, wherein the journal axis of said brackets is offset from the midpoint of said coil in the direction of desired dial head movement, when the axis of symmetry of said dial head and the longitudinal axis of said coil are in substantial alignment.

9. The gauge as claimed in claim 5, wherein each of said brackets includes a side plate and an end plate joined at right angles to said side plate, said end plate having a keyhole-shaped wall extending therein which defines a circular wall portion and contiguous, opposed linear wall portions, the diameter of said circular wall portion being greater than the spacing between the linear wall portions and, further, wherein the means for mounting the brackets for rotation about the axis of symmetry of said dial head and the longitudinal axis of said stem comprises, a pair of elements depending, respectively, from said dial head and said stem, each element including an annular shoulder having a diameter less than the diameter of said circular wall portion but greater than the spacing between said linear wall portions so that with a circular wall portion mounted concentrically on a shoulder radial movement therebetween is limited.

10. The combination of a gauge having a dial head portion mounted for tilting movement relative to a stem portion, indicator means mounted on said dial head portion for angular displacement relative thereto, drive means mounted on said stem portion for causing an angular displacement of said indicator means in response to a change in a gauged condition, and coupling means for transmitting angular displacements of said drive means to said indicator means, said coupling means bending with tilting movement of said dial head portion relative to said stem portion and having opposite ends for coupling said drive means to said indicator means, said coupling means comprising, at least one right-handed elongated coil section and at least one left-handed elongated coil section, the coil sections being coupled together and matched to each other so that relative angular displacements between the opposite ends of said coupling means, caused by variations in length of said coupling means resulting from the bending thereof, are nullified.

11. The combination as claimed in claim 10 wherein said two coil sections comprise, two helical springs coupled in tandem.

References Cited

UNITED STATES PATENTS 3,357,251  12/1967  Harrison _____ 73—363.7

LOUIS R. PRINCE, *Primary Examiner.*

WILLIAM A. HENRY II, *Assistant Examiner.*